E. A. KRANNICH.
TIRE CORE.
APPLICATION FILED NOV. 30, 1917.

1,328,676.

Patented Jan. 20, 1920.
2 SHEETS—SHEET 1.

Inventor
Emil A Krannich
By
John N Orr
Attorney

E. A. KRANNICH.
TIRE CORE.
APPLICATION FILED NOV. 30, 1917.
1,328,676.
Patented Jan. 20, 1920.
2 SHEETS—SHEET 2.
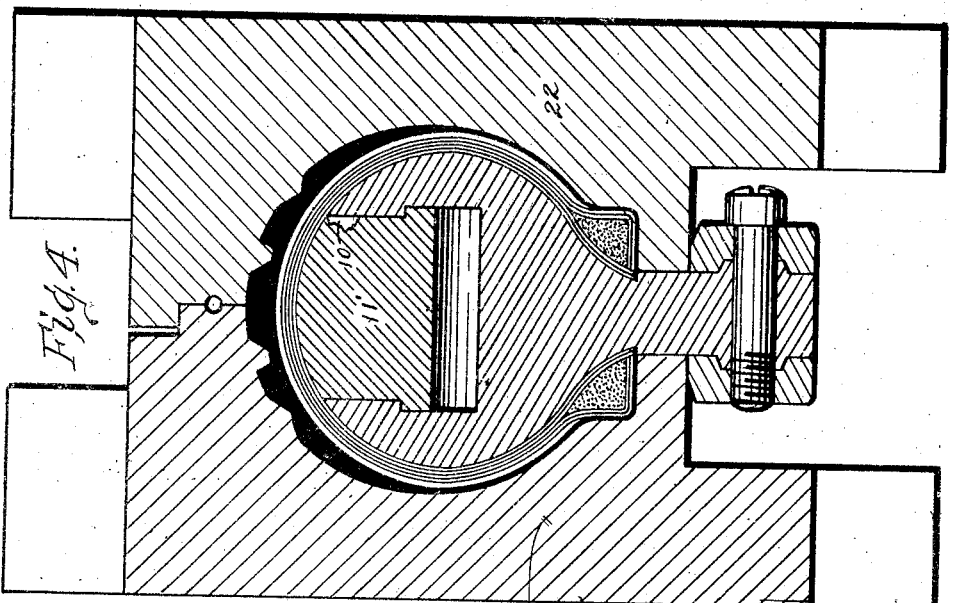
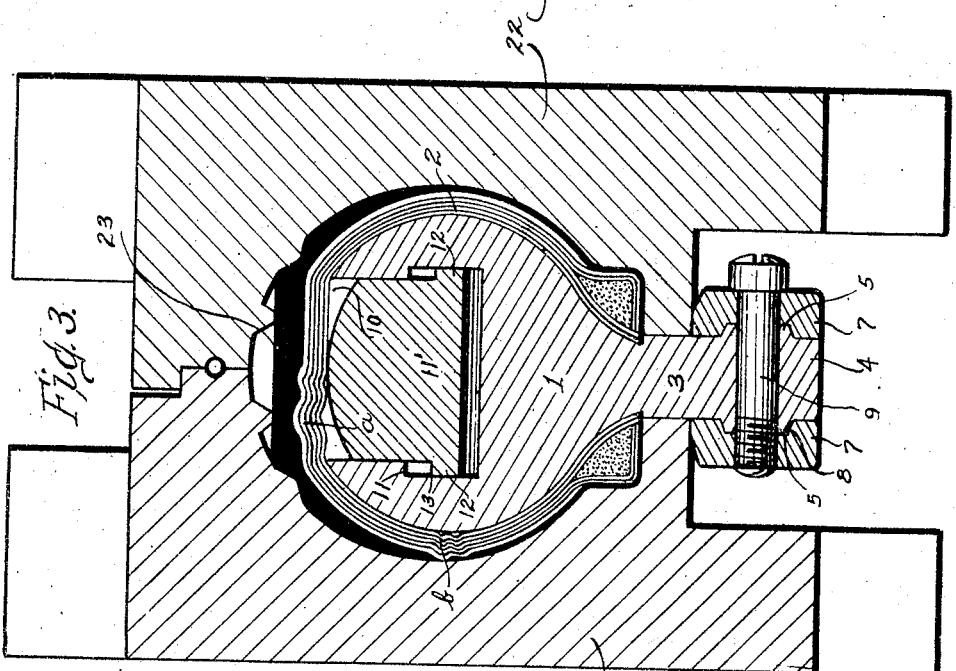
Inventor
Emil A. Krannich
By John N. Dow
his Attorney

UNITED STATES PATENT OFFICE.

EMIL A. KRANNICH, OF COLUMBIANA, OHIO, ASSIGNOR OF ONE-HALF TO LOUIS A. ANDREGG, OF MANSFIELD, OHIO.

TIRE-CORE.

1,328,676.   Specification of Letters Patent.   Patented Jan. 20, 1920.

Application filed November 30, 1917. Serial No. 204,536.

*To all whom it may concern:*

Be it known that I, EMIL A. KRANNICH, a citizen of the United States of America, residing at Columbiana, in the county of Columbiana and State of Ohio, have invented certain new and useful Improvements in Tire-Cores, of which the following is a specification.

This invention relates to a method of and means for manufacturing pneumatic tires, and more particularly to a method of and means for subjecting the fabric layers to a stretching tension, during the process of manufacture, to insure an even, regular contact between the fabric plies, and more important, take out all wrinkles, or other irregularities which may have been formed.

In pneumatic tires as usually manufactured, the tire is built up by wrapping the fabric in successive layers over a core, following which formation the breaker strip is put on, the tread applied, and the mold positioned for forming the tire while the rubber material therein is being vulcanized. During the application of the fabric layers, or in the application of the mold to the otherwise formed tire it oftentimes happens that the fabrics become wrinkled, with the result that if finished, the tire having a wrinkled fabric is weakened by the loss of the resisting strain of that fabric. This defect has been recognized, and attempts have been made to cure it by sectional molds, or core pieces, with means for spreading the core pieces with respect to each other to stretch the fabric and round out the tire. This method has proven objectionable, in that it tends to the very defects sought to be avoided, as the sections of the core necessarily separate when expanded to stretching position, and thereby leave openings or gaps between the core sections into which the rubber or fabric is forced in the application of the mold.

It is therefore important that the tire be built over a solid core, that is, one in which there are no spaces provided when the parts are in final position. It is however necessary that means be provided whereby a final stretching operation be given the formed tire to insure an even, regular tension on all fabric layers.

In putting the tires in the molds after they are wrapped or built around the cores oftentimes the fabrics are wrinkled by the pressure of the molds which force the tread or rubber portion of the tire against the series of fabrics, wrinkling or buckling same, thereby making a defective or what is called a second quality tire.

It is obvious that while building up a tire, the periphery or circumference of the core must be solid, leaving no gaps between the sections, for if this takes place then the rubber or fabric will be worked down into the openings making a defective tire.

The means provided in the present invention comprises a core built up of sections in the ordinary way and then grooving the central portion of the periphery of the sections and providing movable segments to fit the grooves that are normally below the highest point of the periphery of the core and which have wedging means adapted to move the segments to the full circumference of the core of the tire, the segments being forced out through the medium of the wedges by screws to a point to where the proper diameter is obtained and a perfect contour of the core made through the medium of the movable segments and sections.

The present invention contemplates all the above-noted advantages, and consists in a method wherein the tire carcass is initially formed with its final interior dimension except that what corresponds approximately to the tread area is flattened, that is, not rounded into final interior shape; and finally subjecting said flattened portion to a stretching operation, coextensive with the flattened portion, with the stretching means limited to a movement necessary to complete the full interior formation and size of the desired tire. This method insures that all the fabrics be subjected to an even stretching operation to thereby eliminate all wrinkles or other irregularities which may have occurred in making up the body or in applying the mold.

The preferred form of means for carrying out the method, is illustrated in the accompanying drawings, in which:

Fig. 3 is an enlarged transverse sectional view showing the core within a formed tire, the mold in applied position, and the core-stretching means in normal or inoperative position, Fig. 4 is a view similar to Fig. 3 with the stretching means in operative position.

Figure 1:
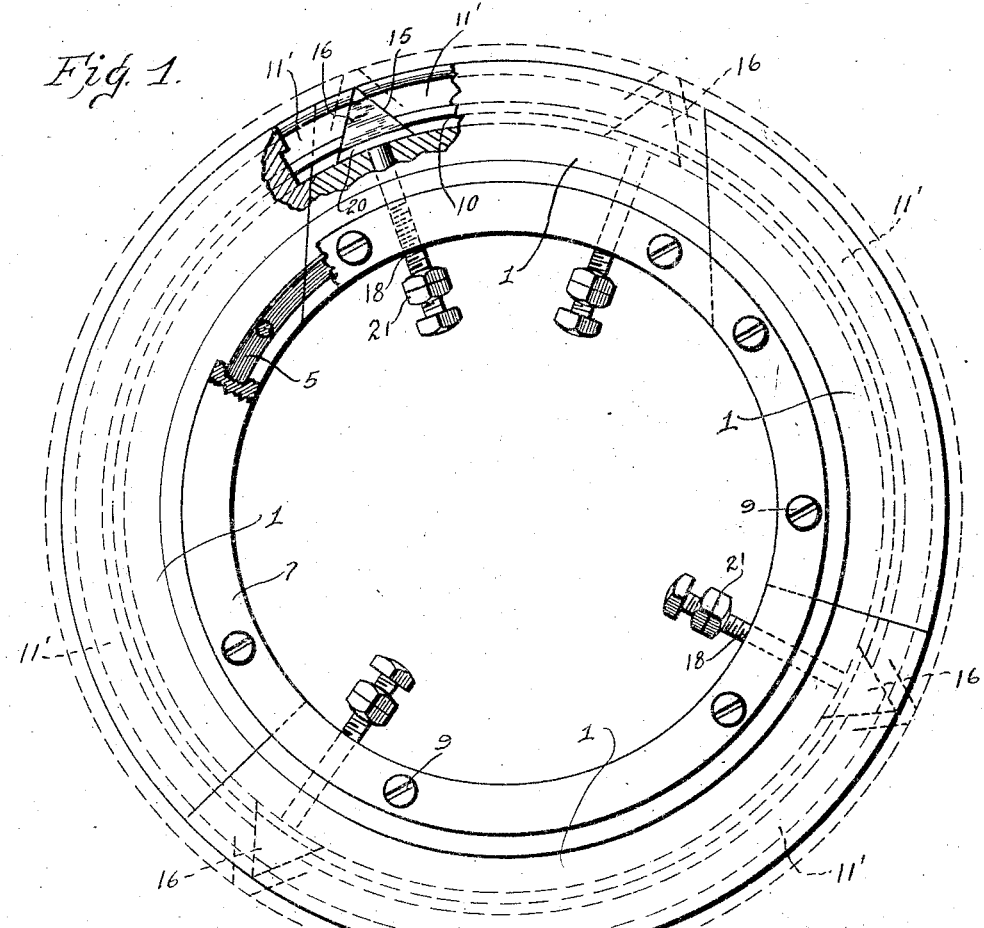
Figure 1 is an elevation, partly broken out, of the improved core.
Figure 2:
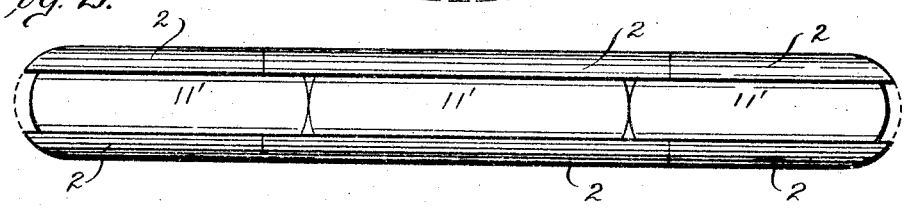
Fig. 2 is an edge view of the same.
Figure 5:
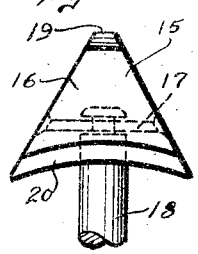
Fig. 5 is a side elevation of the wedge or operative element for the stretching means.
Figure 6:
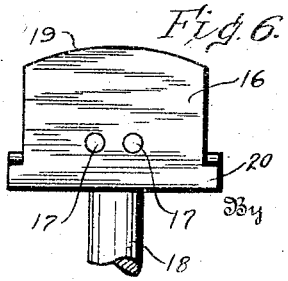
Fig. 6 is an end elevation of the same.

The means used in carrying out the method comprises a core 1, which for purpose of the description may be characterized as solid. In some types of tires, particularly "straight side" tires, it is necessary that the core be formed in sections, so that it may be removed from the complete tire, and hence the core here shown is preferably constructed in sections 2 each having a depending neck or necks 3 terminating in a ring extension 4 having annular ribs 5 on opposing surfaces thereof. The core sections are secured in tire-forming relation with their meeting ends abutting and in contact throughout, rings 7 formed with recesses 8 to engage the ribs 5 being secured in position by bolts 9, to hold the core sections in completed core-forming relation.

As previously stated, the core thus formed is substantially solid, that is, presents an unbroken surface for the side walls of the tire, and this surface is not disturbed or changed during the manufacture of the tire. The central portion of each section, however, is formed with a longitudinally-extending channel or recess 10, extending through the surface of the section, and for a portion of the depth thereof, the side walls at the lower portion of the channel being cut away to present shoulders 11 at an appropriate point in each of said walls, and coextensive with the length thereof.

In each of the channels 10 is arranged a stretching member 11', here shown as a solid block coextensive in width with the similar dimension of the channel, but of less depth than that of the channel. The block has side projections 12 fitting the enlarged portion of the channel walls and presenting abrupt shoulders 13 adapted when the stretching member is in operative or stretching position to engage the shoulders 11 of the channel walls. The outer or engaging surface of the stretching member is shaped so that when said member is in operative position it will complete the outer contour of the core throughout the area of the channel, and the inward movement permitted the stretching members is such that when said members are in normal or inoperative position the highest point of said members is approximately in line with the outer edges of the channel walls.

The meeting ends of the stretching members are downwardly divergent, as at 15. Operating members in the form of wedge elements 16 are arranged between the meeting ends of the stretching members, and connected by transverse pins 17 with a rod 18 extending through and having threaded connection with the neck 3 and ring extensions 4 of the respective core sections. The wedge members have their outer surfaces 19 formed in comformity with that of the stretching members, and such wedge members are further formed with projections 20 to operate in the enlarged portions of the channel walls of the core, and engage the shoulders 11 of such walls to limit the outward movement of the wedge members. If desired, and as preferred, the rods 18 are provided with limiting nuts 21 which, through engagement with the inner surface of the rings 4 of the core sections, may also serve to limit the movement of the wedges in one direction.

It will be observed that if the flat point 27 of the tire is lower than the lugs 23, there will be no obstruction to the mold fitting over the tire and consequently no effect will be had upon the tread nor the several plies of the fabric to cause a wrinkle in the plies of the fabric when the molds are being fitted to the tire and core.

As thus constructed, the core is substantially solid throughout the greater portion of its tire-forming area, and hollow throughout substantially the tread portion of such area.

In building up the tire the successive layers of fabric are applied, following which the breaker strip is placed in position and the tread or outer section applied. As this is carried out with the stretching members in normal or withdrawn positions, it is apparent that the central or substantially the tread portion area of the tire is flat, as will be particularly noted from Fig. 3. In the application of the mold indicated at 22 to the tire so formed, it is apparent that there will be little if any obstruction in fitting the mold over the tire and consequently a more ready application of the mold and less liability of the mold forcing the tire fabric into wrinkles. Following the application of the mold the screw rods 18 are operated to move the wedges outwardly, and thereby cause a corresponding outward movement of the stretching members. This movement of the stretching members compels a stretching or tensioning of the fabric layers and insures an even, uniform contact of the fabric plies, and the positive elimination of all wrinkles or other irregularities which may have existed.

Furthermore the stretching operation forces the rubber tread into the mold formation, as where non-skid types of tires are made, and insures a sharp, perfect replica of the mold form.

The stretching operation is essentially important in tire manufacture as each ply of fabric is initially impregnated with rubber, which coating maintains the fabrics spaced apart in application, and this disadvantage is overcome, and more or less perfect adhesion secured by stretching.

The essential characteristics of the improved method reside in forming the tire of substantially permanent interior dimensions except throughout a limited area, and finally stretching this area to the desired dimension and contour.

The real essence of the invention consists of providing a core that is substantially integral and at the same time providing means of stretching the entire tire consisting of the plurality of plies of fabric from the inside out to draw out the wrinkles that have been put in or left in by the tire builder while building the tire or that have been forced into the fabric by the molds when they are fitted over the tire casing preparatory to subjecting them to the vulcanizing process.

$a$ and $b$ indicate wrinkles in the fabric as shown in Fig. 3, the same being shown stretched out in Fig 4.

Having thus described the invention, what is claimed is:

1. The herein described method consisting in building up a tire with a portion thereof flattened, and finally stretching and rounding said flattened portion into completed tire form by direct acting uniform pressure sections.

2. The herein described method of initially forming tire casings about a core to avoid stretching the surface material in the application of the mold sections, consisting in initially forming the casing about the core with the same internal dimensions as the finished tire with the exception of the tread portion thereof which is disposed inwardly of the plane of movement of the coöperating projections of the mold sections, whereby to avoid engagement of such projections with the casing material in the application of the molds, and then stretching said tire casings into complete tire form by positive mechanical means.

3. A tire core of permanent contour having a channel formed throughout a portion thereof, and stretching members operative in the channel to complete the core contour throughout the channel area.

4. A tire core having permanent contour and dimensions and formed with a longitudinally-extending channel, stretching members arranged in the channel and movable to a position to complete the contour of the core or to form a break therein, and means for operating the stretching members.

5. A tire core having permanent contour and dimensions and formed with a longitudinally-extending channel, stretching members arranged in the channel and movable to a position to register with and complete the contour of the core or to form a break therein, and wedges for operating the stretching members.

6. A tire core having permanent contour and dimensions and formed with a longitudinally extending channel, stretching members arranged in the channel and movable to a position to register with and complete the contour of the core or to form a a break therein, wedges for operating the stretching members, and means for limiting the operative movement of the stretching members.

7. An expansible core for use in building tires comprising a series of sections clamped together end to end to provide a solid former; said core sections having grooves formed in the central portions thereof, a series of segments movably fitted to said grooves, and means for imparting movement to said segments to move them to a position to complete the peripheral circular contour of the core, as described and set forth.

8. An expansible core for building tires, comprising a series of sections clamped together end to end to form a solid core provided with a groove in the central portion of the periphery, a series of segments movably fitted to said groove, and means for imparting movement to said segments to complete the circular contour of the first named sections.

9. In a core for building tires, the combination of a core comprising a series of sections which are clamped together end to end to form a solid core, and which are provided with a groove in the central portion of the periphery, a series of sections comprising segments of a circle movably fitted to said groove and adapted when expanded to complete the peripheral circular contour of the first named sections.

10. In a core for building tires, the combination of a core comprising a series of sections which are clamped together end to end to form a solid core and which are provided with a groove in the central portion of the periphery, a series of sections comprising segments of a circle movably fitted to said groove and adapted when expanded to complete the peripheral circular contour of the first named sections, means for imparting movement to said peripheral segments, and means for limiting the movement thereof.

11. An expansible core comprising a core constructed in sections and provided with peripheral grooves, expansible means fitted to said grooves, and means for imparting movement to said expansible means to position the said expansible means to form a circle of the periphery of the core sections.

12. An expansible core comprising a core constructed in sections and provided with peripheral grooves, expansible means fitted to said grooves, means for imparting movement to said expansible means to position the said expansible means to form a circle of the periphery of the core sections, and means for stopping the expansible means at a predetermined point.

13. In a core for building tires comprising in combination a series of non-movable sections having alined peripheral grooves formed therein, means for clamping said sections together, a series of movable segments fitted in the grooves of said sections and mechanical means to expand said segments.

14. In a core for building tires comprising in combination a series of sections having alined peripheral grooves formed therein, means to clamp said sections immovably together, a series of movable segments fitted to the grooves of the sections, and means to expand said segments.

15. In a core for building tires comprising in combination a series of sections having alined peripheral grooves formed therein, means to clamp said sections immovably together, a series of movable segments fitted to the grooves of the sections, means to expand said segments, and adjustable means to limit the movement of the segments and stop same at a predetermined point.

16. The herein described method consisting in building a tire of permanent interior dimensions and contour except throughout a limited area, and finally stretching by positive mechanical means the limited area section into final form.

17. The herein described method consisting in forming a tire of permanent interior dimensions and form except throughout an area corresponding substantially to the tread area, and finally stretching by positive mechanical means said area into final form.

18. The herein described method consisting in building the tire into final form and dimensions except in one direction, and finally stretching the tire by positive mechanical means to complete this dimension and simultaneously form such part.

19. The herein described method consisting in building a tire carcass of permanent interior form and dimensions except throughout the approximate tread area, applying the mold for the outer shape and surface of the tire, and finally stretching such tread area section into final form and dimensions.

In testimony whereof I affix my signature.

EMIL A. KRANNICH.